United States Patent
Sasaki

(10) Patent No.: US 8,973,781 B2
(45) Date of Patent: Mar. 10, 2015

(54) CONTAINER STOPPER COMPRISING FOAM-MOLDED ARTICLE

(75) Inventor: Hiromitsu Sasaki, Chiba (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 13/498,639

(22) PCT Filed: Sep. 30, 2010

(86) PCT No.: PCT/JP2010/067180
§ 371 (c)(1),
(2), (4) Date: Mar. 28, 2012

(87) PCT Pub. No.: WO2011/040585
PCT Pub. Date: Apr. 7, 2011

(65) Prior Publication Data
US 2012/0181295 A1    Jul. 19, 2012

(30) Foreign Application Priority Data
Sep. 30, 2009   (JP) ................................ 2009-225749

(51) Int. Cl.
| | |
|---|---|
| B65D 43/04 | (2006.01) |
| C08J 9/00 | (2006.01) |
| B65D 39/00 | (2006.01) |
| C08L 23/00 | (2006.01) |
| C08L 23/02 | (2006.01) |
| C08L 53/02 | (2006.01) |

(52) U.S. Cl.
CPC .......... *C08J 9/0061* (2013.01); *B65D 39/0011* (2013.01); *C08L 23/00* (2013.01); *C08L 23/02* (2013.01); *C08L 53/025* (2013.01); *C08J 2323/02* (2013.01); *C08J 2353/02* (2013.01); *C08J 2423/00* (2013.01); *C08J 2453/00* (2013.01); *C08L 2205/12* (2013.01)
USPC ........................................................ 220/789

(58) Field of Classification Search
CPC ....... C08J 9/0061; C08L 53/02; C08L 53/025
USPC ............................................. 521/50; 525/98
See application file for complete search history.

(56) References Cited

U.S. PATENT DOCUMENTS

| | | | | |
|---|---|---|---|---|
| 5,130,340 | A | * | 7/1992 | Allen et al. ..................... 521/59 |
| 5,480,915 | A | * | 1/1996 | Burns ............................. 521/50 |
| 6,127,444 | A | * | 10/2000 | Kadri ............................. 521/139 |
| 2006/0205890 | A1 | * | 9/2006 | Sasagawa et al. .......... 525/333.3 |
| 2007/0071939 | A1 | | 3/2007 | Hueto |
| 2007/0287779 | A1 | * | 12/2007 | Kimura et al. ................ 524/186 |
| 2009/0253818 | A1 | | 10/2009 | Kimura et al. |
| 2009/0312449 | A1 | * | 12/2009 | Sasaki et al. .................. 521/148 |

FOREIGN PATENT DOCUMENTS

| | | |
|---|---|---|
| EP | 1192090 | 8/2006 |
| EP | 1 942 133 A1 | 7/2008 |
| JP | 2003 503288 | 1/2003 |
| JP | 2003277539 A * | 10/2003 |
| JP | 2004 107519 | 4/2004 |
| JP | 2005 255830 | 9/2005 |
| JP | 2007 091974 | 4/2007 |
| JP | 2009 132759 | 6/2009 |
| WO | WO 00/26103 | 5/2000 |
| WO | WO 0102263 A * | 1/2001 |
| WO | WO 2007094216 A1 * | 8/2007 |

OTHER PUBLICATIONS

International Search Report Issued Nov. 16, 2010 in PCT/JP10/67180 Filed Sep. 30, 2010.
The European Search Report issued Apr. 1, 2014, in Application No. / Patent No. 10820700.2-1304 / 2484717.

* cited by examiner

*Primary Examiner* — Randy Gulakowski
*Assistant Examiner* — Christina Wales
(74) *Attorney, Agent, or Firm* — Oblon, McClelland, Maier & Neustadt, L.L.P.

(57) ABSTRACT

Provided is a container stopper containing a foam-molded article which has an expansion ratio of 1.1 to 2.5 times and is obtained by foaming a mixture containing: a thermoplastic elastomer composition containing 100 parts by mass of (a) a hydrogenated block copolymer containing (A) a polymer block containing a structural unit derived from an aromatic vinyl compound and (B) a polymer block containing a structural unit derived from isoprene or a mixture of isoprene and butadiene, 5 to 150 parts by mass of (b) a softening agent, and from 5 to 150 parts by mass of (c) a polyolefin resin; and (d) 0.1 to 3% by mass of a foaming agent.

15 Claims, No Drawings

CONTAINER STOPPER COMPRISING FOAM-MOLDED ARTICLE

TECHNICAL FIELD

The present invention relates to a container stopper containing a foam-molded article excellent in uniformity of foam cell size, which is obtained by foaming a mixture of a thermoplastic elastomer composition and a foaming agent, in which the container stopper has good oxygen gas barrier property and excellent pull-out property.

BACKGROUND ART

A synthetic resin stopper can solve the problems associated with natural cork, such as corky odor and bacterial contamination, can be appropriately controlled in hardness and specific gravity, and has sufficient sealing property and pull-out property, and thus a synthetic resin stopper is being widely used in recent years as a substitute of a cork stopper.

As the synthetic resin stopper, there are proposed ones containing a foamed material obtained by foaming a composition containing a hydrogenated product of a block copolymer having a polymer block mainly containing a vinyl aromatic compound and a polymer block mainly containing a conjugated diene.

For example, Patent Document 1 discloses a container stopper containing, in at least a part that is brought into contact with an inner surface of a container mouth, an elastic material that is a independent cell type foamed material having an expansion ratio of from 1.01 to 4 times, containing a hydrogenated product of a block copolymer of an alkenyl aromatic hydrocarbon and a conjugated diene, or a mixture of the hydrogenated block copolymer and a polyolefin. It is stated that the container stopper has compression stress-strain characteristics that is close to those of wet cork, and is excellent in airtightness and gas barrier property, as compared to natural cork.

Patent Document 2 discloses a synthetic bottle stopper containing a foamed material of a thermoplastic elastomer composition containing a thermoplastic block copolymer, a foaming agent, and optionally a plasticizer, in which the composition further contains a branched polyolefin having a melt flow index of from 0.05 to 400. There is further disclosed that the thermoplastic block copolymer contains a glassy polymer block containing an aromatic vinyl monomer, and an elastic polymer block containing a conjugated diene.

There is stated as a characteristic feature that the synthetic bottle stopper disclosed in Patent Document 2 contains no oil as a plasticizer, and the suitable density thereof provides excellent stopper insertion and pull-out property with physical properties similar to cork.

Patent Document 3 discloses a molded closure for liquid container, containing a thermoplastic elastomer and a foaming agent. There is disclosed that upon inserting the molded closure into a container, the molded closure inhibits substantial permeation of oxygen into the container, does not absorb oxygen from the content of the container, is taken out from the container with a corkscrew without substantial expansion, crash or collapse, prevents substantially the content of the container from being putrefied, enables horizontal placement of the container immediately after inserting the molded closure into the container, and maintains permanently a printed matter on the surface of the molded closure. As the thermoplastic elastomer, styrene block copolymers, such as a styrene-ethylene-butylene-styrene copolymer, a styrene-butadiene-styrene copolymer and a styrene-isoprene-styrene copolymer, are exemplified.

Patent Document 4 discloses a thermoplastic foamable resin composition containing 100 parts by mass of a resin composition, which is obtained by mixing from 50 to 200 parts by mass of a softening agent for nonaromatic rubber and from 5 to 50 parts by mass of a polyethylene resin polymerized with a metallocene catalyst with 100 parts by mass of a hydrogenated block copolymer obtained by hydrogenating a block copolymer having one or more polymer block A mainly containing an aromatic vinyl compound and one or more polymer block B mainly containing a conjugated diene compound, and from 0.5 to 10 parts by mass of a chemical foaming agent having a decomposition temperature of 160° C. or less, and a foamed material thereof. There is stated that the composition is excellent in foaming property and flexibility upon foaming, and can have a reduced weight with a high expansion ratio.

RELATED ART DOCUMENTS

Patent Documents

Patent Document 1: JP-A-58-134863
Patent Document 2: JP-A-2003-503288
Patent Document 3: JP-A-9-500074
Patent Document 4: JP-A-2007-91974

SUMMARY OF THE INVENTION

Problems to be Solved by the Invention

However, the synthetic resin stoppers disclosed in Patent Documents 1 to 3 are currently still insufficient in oxygen gas barrier property, and thus have room for improvement in this viewpoint. The thermoplastic foamable resin composition and the foamed material disclosed in Patent Document 4 show nothing about oxygen gas barrier property and application to a container stopper.

Accordingly, an object of the present invention is to provide a container stopper containing a foam-molded article excellent in uniformity of foam cell size, which is obtained by foaming a mixture of a thermoplastic elastomer composition and a foaming agent, in which the container stopper has good oxygen gas barrier property and excellent pull-out property.

Means for Solving the Problems

As a result of earnest investigations made by the inventors for solving the problems, it has been found that the problems can be solved by a container stopper containing a foam-molded article having a particular expansion ratio, which is obtained by foaming by adding a particular amount of a foaming agent to a thermoplastic elastomer composition containing particular proportions of a softening agent and a polyolefin resin in a particular hydrogenated block copolymer.

The present invention relates to the following items (1) to (3).

(1) A container stopper containing a foam-molded article having an expansion ratio of from 1.1 to 2.5 times, the foamed article being obtained by foaming a mixture containing:
    a thermoplastic elastomer composition containing
        100 parts by mass of (a) a hydrogenated block copolymer that is a hydrogenated product of a block copolymer containing (A) a polymer block containing a structural unit derived from an aromatic vinyl compound and (B) a polymer block containing a structural unit derived from isoprene or a mixture of isoprene and butadiene, having a total content of a 3,4-bond unit and a 1,2-bond unit of 45% or more, has a peak top molecular weight (Mp) obtained by gel permeation chromatograph in terms of polystyrene standard of from 250,000 to 500,000, and is in a form of powder having a bulk density of from 0.10 to 0.40 g/mL, from 5 to 150 parts by mass of (b) a softening agent, and from 5 to 150 parts by mass of (c) a polyolefin resin; and (d) a foaming agent added in an amount of from 0.1 to 3% by mass based on a total mass of the thermoplastic elastomer composition.

(2) The container stopper according to the item (1), wherein the polymer block (B) of the hydrogenated block copolymer (a) contains a structural unit derived from isoprene.

(3) The container stopper according to the item (1) or (2), wherein the content of the softening agent (b) is from 70 to 120 parts by mass, and the content of the polyolefin resin (c) is from 30 to 100 parts by mass, per 100 parts by mass of the hydrogenated block copolymer (a).

Advantages of the Invention

According to the present invention, a container stopper can be provided that contains a foam-molded article excellent in uniformity of foam cell size, which is obtained by foaming a mixture of a thermoplastic elastomer composition and a foaming agent, in which the container stopper has good oxygen gas barrier property and excellent pull-out property.

EMBODIMENTS FOR CARRYING OUT THE INVENTION

The thermoplastic elastomer composition constituting the foam-molded article used in the container stopper of the present invention contains 100 parts by mass of the particular hydrogenated block copolymer (a) described later, from 5 to 150 parts by mass of the softening agent (b), and from 5 to 150 parts by mass of the polyolefin resin (c). A mixture obtained by adding a particular amount of the foaming agent (d) to the thermoplastic elastomer composition is foamed, thereby providing the container stopper of the present invention containing a foam-molded article having a particular expansion ratio.

The components will be described in detail below.

Thermoplastic Elastomer Composition

Hydrogenated Block Copolymer (a)

The hydrogenated block copolymer (a) used in the present invention is a hydrogenated product of a block copolymer containing (A) a polymer block containing a structural unit derived from an aromatic vinyl compound and (B) a polymer block containing a structural unit derived from isoprene or a mixture of isoprene and butadiene, having a total content of a 3,4-bond unit and a 1,2-bond unit of 45% or more, and the hydrogenated block copolymer (a) has a peak top molecular weight (Mp) obtained by gel permeation chromatograph in terms of polystyrene standard of from 250,000 to 500,000, and is in a form of powder having a bulk density of from 0.10 to 0.40 g/mL.

A 3,4-bond unit and a 1,2-bond unit in a structural unit derived from isoprene and a 1,2-bond unit in a structural unit derived from butadiene herein are referred to as "vinyl bond units", and the total content thereof is referred to as a "vinyl bond content".

The polymer block (A) of the hydrogenated block copolymer (a) mainly contains a structural unit derived from an aromatic vinyl compound (i.e., an aromatic vinyl compound unit). The term "mainly" herein means that the amount of the aromatic vinyl compound unit is preferably 90% by mass or more, more preferably 95% by mass or more, and further preferably 100% by mass, based on the mass of the polymer block (A).

Examples of the aromatic vinyl compound constituting the polymer block (A) include styrene, α-methylstyrene, β-methylstyrene, o-methylstyrene, m-methylstyrene, p-methylstyrene, 4-t-butylstyrene, 2,4-dimethylstyrene, 2,4,6-trimethylstyrene, monofluorostyrene, difluorostyrene, monochlorostyrene, dichlorostyrene, methoxystyrene, vinylnaphthalene and vinylanthracene.

The polymer block (A) may contain a structural unit derived only from one kind of the aromatic vinyl compound and may contain structural units derived from two or more kinds thereof. Among these, the polymer block (A) is preferably constituted mainly from a structural unit derived from styrene. The term "mainly" herein means that the amount of the structural unit derived from styrene is preferably 90% by mass or more, more preferably 95% by mass or more, and further preferably 100% by mass, based on the mass of the polymer block (A).

The polymer block (A) may contain, in addition to the structural unit derived from the aromatic vinyl compound, a small amount of a structural unit derived from other copolymerizable monomers. In this case, the proportion of the structural unit derived from other copolymerizable monomers is preferably 10% by mass or less, and more preferably 5% by mass or less, based on the mass of the polymer block (A). Examples of the other copolymerizable monomers include copolymerizable monomers capable of undergoing ionic polymerization, such as 1-butene, pentene, hexene, butadiene, isoprene and methyl vinyl ether. In the case where the structural unit derived from the aromatic vinyl compound and the structural unit derived from the other copolymerizable monomers are contained, the bonding mode thereof may be any mode including a random mode, a tapered mode and the like.

The polymer block (B) of the hydrogenated block copolymer (a) mainly contains a structural unit derived from isoprene solely or a mixture of isoprene and butadiene. The term "mainly" herein means that the amount of the structural unit derived from isoprene solely or a mixture of isoprene and butadiene is preferably 90% by mass or more, more preferably 95% by mass or more, and further preferably 100% by mass, based on the mass of the polymer block (B).

The increase of the content of the 1,2-bond unit in structural units derived from other conjugated dienes than isoprene solely or a mixture of isoprene and butadiene, for example, in structural units derived from butadiene solely, fails to improve the oxygen gas barrier property, and therefore, it has less practical significance.

In the case where the polymer block (B) mainly contains the structural unit derived from isoprene solely, the structural units contain a 2-methyl-2-buten-1,4-diyl group (—CH$_2$—C(CH$_3$)=CH—CH$_2$—, i.e., the 1,4-bond unit), an isopropenylethylene group (—CH(C(CH$_3$)=CH$_2$)—CH$_2$—, i.e., the 3,4-bond unit), and a 1-methyl-2-vinylethylene group (—C(CH$_3$)(CH=CH$_2$)—CH$_2$—, i.e., the 1,2-bond unit). In the present invention, it is necessary that the vinyl bond content in the total structural units of the polymer block (B) is 45% or more. The vinyl bond content is preferably 47% or more, more preferably 50% or more, and further preferably 53% or more. The upper limit of the vinyl bond content is not particularly limited, and in general is preferably 95% or less, more preferably 90% or less, further preferably 80% or less, and particularly preferably 70% or less. In consideration of the above, the vinyl bond content is preferably from 47 to 90%, more preferably from 50 to 90%, further preferably from 50 to 80%, still further preferably from 50 to 70%, still further preferably from 53 to 90%, still further preferably from 53 to 80%, and still further preferably from 53 to 70%.

When the vinyl bond content is in the range, the foam cell size of the foam-molded article obtained by adding the foaming agent (d) becomes uniform, and the container stopper of the present invention has good oxygen gas barrier property.

The vinyl bond content referred herein is a value obtained by measurement of $^1$H-NMR spectrum according to the method described for the examples.

In the case where the polymer block (B) mainly contains the structural unit derived from a mixture of isoprene and butadiene, the structural units thereof contain a 2-methyl-2-buten-1,4-diyl group, an isopropenylethylene group and a 1-methyl-1-vinylethylene group derived from isoprene, and a 2-buten-1,4-diyl group ($-CH_2-CH=CH-CH_2-$, i.e., the 1,4-bond unit) and a vinylethylene group ($-CH(CH=CH)-CH_2-$, i.e., the 1,2-bond unit) derived from butadiene. In the present invention, it is necessary that the vinyl bond content in the total structural units of the polymer block (B) is 45% or more. The vinyl bond content is preferably 47% or more, more preferably 50% or more, further preferably 53% or more, and particularly preferably 55% or more. The upper limit of the vinyl bond content is not particularly limited, and in general is preferably 95% or less, more preferably 90% or less, further preferably 80% or less, and particularly preferably 70% or less. In consideration of the above, the vinyl bond content is preferably from 47 to 90%, more preferably from 50 to 90%, further preferably from 50 to 80%, still further preferably from 50 to 70%, still further preferably from 53 to 90%, still further preferably from 53 to 80%, still further preferably from 53 to 70%, and particularly preferably from 55 to 70%.

In the copolymer block, the bonding mode of the structural unit derived from isoprene and the structural unit derived from butadiene may be any of a random mode, a block mode and a tapered mode.

In the case where the polymer block (B) contains the structural unit derived from a mixture of isoprene and butadiene, the proportion of the isoprene unit based on the total of the isoprene unit and the butadiene unit is preferably 10% by mol or more, more preferably 30% by mol or more, and further preferably 40% by mol or more, from the standpoint of maintaining the good oxygen gas barrier property of the container stopper of the present invention.

The polymer block (B) may contain, in addition to the structural unit derived from isoprene or a mixture of isoprene and butadiene, a small amount of a structural unit derived from other copolymerizable monomers within the range not impairing the purpose of the invention. In this case, the proportion of the structural unit derived from other copolymerizable monomers is preferably 30% by mass or less, more preferably 10% by mass or less, and further preferably 5% by mass or less, based on the mass of the polymer block (B). Examples of the other copolymerizable monomers include copolymerizable monomers capable of undergoing anion polymerization, such as an aromatic vinyl compound, e.g., styrene, α-methylstyrene, o-methylstyrene, m-methylstyrene, p-methylstyrene, 1,3-dimethylstyrene, diphenylethylene, 1-vinylnaphthalene, 4-propylstyrene, 4-cyclohexylstyrene, 4-dodecylstyrene, 2-ethyl-4-benzylstyrene and 4-(phenylbutyl)styrene. These other copolymerizable monomers may be used solely or as a combination of two or more kinds thereof. In the case where the polymer block (B) contains the structural unit derived from the other copolymerizable monomers in addition to the structural unit derived from isoprene or a mixture of isoprene and butadiene, the bonding mode thereof may be any of a random mode, a tapered mode and the like.

In the hydrogenated block copolymer (a) used in the present invention, the unsaturated double bonds (i.e., carbon-carbon double bonds) in the polymer block (B) are entirely or partially hydrogenated for providing favorable heat resistance and weather resistance therefor. In this case, the hydrogenation degree of the polymer block (B) is preferably 50% by mol or more, more preferably 60% by mol or more, further preferably 70% by mol or more, still further preferably 80% by mol or more, and particularly preferably 90% by mol or more. The hydrogenation degree referred herein may also be referred to as a "hydrogenation degree of the hydrogenated block copolymer (a)".

The hydrogenation degree of the unsaturated double bonds in the polymer block (B) herein is a value obtained in such a manner as described for the examples that the content of the unsaturated double bonds in the polymer block (B) is measured with a nuclear magnetic resonance spectrometer ($^1$H-NMR) before and after hydrogenation, and the hydrogenation degree is obtained from the measured values.

The hydrogenated block copolymer (a) may have one kind or two or more kinds of functional groups, such as a carboxyl group, a hydroxyl group, an acid anhydride group, an amino group and an epoxy group, in some cases, within the molecular chain and/or at the molecular ends, unless the advantages of the present invention are considerably impaired.

The hydrogenated block copolymer (a) is a hydrogenated product of a block copolymer that contains at least one block of each of the polymer block (A) and the polymer block (B). The hydrogenated block copolymer (a) is preferably a hydrogenated product of a block copolymer that contains at least two blocks of the polymer blocks (A) and at least one block of the polymer block (B). The bonding mode of the polymer block (A) and the polymer block (B) is not particularly limited, and may be any of linear, branched, radial and combined bonding modes including two or more thereof. The bonding mode is preferably a linear bonding mode, and is preferably bonding modes represented by $(A-B)_l$, $A-(B-A)_m$ and $B-(A-B)_n$, (wherein A represents the polymer block (A); B represents the polymer block (B); and l, m and n each independently represent an integer of 1 or more), and from the standpoint of the rubber elasticity, the flexibility and the like of the resulting foam-molded article, the bonding mode is more preferably a bonding mode represented by $(A-B)_l$ or $A-(B-A)_m$, and further preferably a di-block structure represented by A-B or a tri-block structure represented by A-B-A.

In the case where the hydrogenated block copolymer (a) contains two or more blocks of the polymer blocks (A) or two or more blocks of the polymer blocks (B), the plural polymer blocks (A) or polymer blocks (B) may be blocks having the same structure or blocks having different structures. For example, in the two polymer blocks (A) in the tri-block structure represented by A-B-A, the aromatic vinyl compounds constituting them may be the same as or different from each other.

The content of the polymer block (A) in the hydrogenated block copolymer (a) is preferably from 5 to 70% by mass, more preferably from 15 to 50% by mass, and further preferably from 15 to 35% by mass, based on the hydrogenated block copolymer (a). When the content of the polymer block (A) is in the range, the resulting thermoplastic elastomer composition may be excellent in rubber elasticity and flexibility. The content of the polymer block (A) in the hydrogenated block copolymer (a) herein is a value obtained according to the method described for the examples.

In the hydrogenated block copolymer (a), the peak top molecular weight of the polymer block (A) is preferably from 10,000 to 60,000, more preferably from 15,000 to 45,000, further preferably from 25,000 to 40,000, and particularly preferably from 30,000 to 40,000, and the peak top molecular weight of the polymer block (B) before hydrogenation is preferably from 130,000 to 450,000, and more preferably from 180,000 to 430,000.

The peak top molecular weight (Mp) of the total hydrogenated block copolymer (a) after hydrogenation is 250,000 to 500,000, preferably from 280,000 to 500,000, more preferably from 300,000 to 500,000, further preferably from 310,000 to 500,000, still further preferably from 310,000 to 400,000, and particularly preferably from 310,000 to 350,000. When the peak top molecular weight (Mp) of the hydrogenated block copolymer (a) is in the range, the hydrogenated block copolymer (a) that is in the form of powder having a bulk density of from 0.10 to 0.40 g/mL may be easily obtained, and the block copolymer (a) may be excellent in absorption of the softening agent (b). Furthermore, the resulting thermoplastic elastomer composition may be excellent in retention of the softening agent (b). Accordingly, the container stopper of the present invention containing a foam-molded article obtained by foaming the thermosetting elastomer composition may be free from bleed or the like of the softening agent (b).

The peak top molecular weight (Mp) referred herein is a value obtained by a gel permeation chromatography (GPC) method in terms of polystyrene standard, as described in the examples.

It is important that the hydrogenated block copolymer (a) is in the form of powder having a bulk density of from 0.10 to 0.40 g/mL from the standpoint of absorption of the softening agent (b), and the bulk density is more preferably from 0.15 to 0.35 g/mL. When the bulk density is less than 0.10 g/mL, the handleability may be deteriorated, and when it exceeds 0.40 g/mL, the absorption of the softening agent (b) may be deteriorated, and the intended properties and characteristics may not be obtained. The bulk density referred herein is a value obtained in such a manner that the hydrogenated block copolymer (a) in the form of powder is weighed and placed in a measuring cylinder for measuring the volume, and the mass of the hydrogenated block copolymer (a) is divided by the volume to provide the bulk density, as described in the examples.

Production Method of Hydrogenated Block Copolymer (a)

Examples of the production method of the hydrogenated block copolymer (a) include an ionic polymerization method, such as anionic polymerization and cationic polymerization, a single site polymerization method, and a radical polymerization method. In the case where an anion polymerization method is employed, for example, an aromatic vinyl compound and isoprene (or a mixture of isoprene and butadiene) are sequentially polymerized in an organic solvent that is inert to the polymerization reaction, such as n-hexane or cyclohexane, with an alkyl lithium compound or the like used as a polymerization initiator, thereby producing a block copolymer having the intended molecular structure and molecular weight, and then the polymerization is terminated by adding an active hydrogen compound, such as an alcohol, a carboxylic acid or water, thereby producing the block copolymer. The polymerization is performed generally at a temperature of from 0 to 80° C. for a period of from 0.5 to 50 hours.

After isolating the resulting block copolymer, or preferably not isolating the block copolymer, the hydrogenation reaction is subsequently performed in the presence of a hydrogenation catalyst in an organic solvent that is inert to the polymerization reaction, thereby providing the hydrogenated block copolymer (a).

Examples of the alkyl lithium compound as the polymerization initiator include an alkyl lithium compound having an alkyl residual group containing from 1 to 10 carbon atoms, and preferred examples thereof include methyl lithium, ethyl lithium, butyl lithium and pentyl lithium. The amount of the initiator used, such as the alkyl lithium compounds, may be determined depending on the peak top molecular weight (Mp) of the target hydrogenated block copolymer (a), and is preferably approximately from 0.01 to 0.2 part by mass per 100 parts by mass of the total monomers to be polymerized.

In order that the structural unit derived from isoprene or a mixture of isoprene and butadiene in the polymer block (B) of the hydrogenated block copolymer (a) has a vinyl bond content of 45% or more, a Lewis base may be used as a co-catalyst on polymerization. Examples of the Lewis base include an ether compound, such as dimethyl ether, diethyl ether, tetrahydrofuran (THF) and dioxane; an glycol ether compound, such as ethylene glycol dimethyl ether and diethylene glycol dimethyl ether; an amine compound, such as triethylamine, N,N,N',N'-tetramethylethylenediamine (TMEDA) and N-methylmorpholine; a nitrogen-containing heterocyclic aromatic compound, such as pyridine; a sulfoxide, such as dimethylsulfoxide; and a ketone, such as acetone and methyl ethyl ketone. The Lewis bases may be used solely or as a combination of two or more kinds thereof. Among these, the Lewis base is preferably an ether compound and an amine compound, and more preferably THF and TMEDA.

The amount of the Lewis base used is preferably approximately from 0.1 to 1,000 mol, more preferably from 0.1 to 100 mol, and further preferably from 1 to 100 mol, per 1 mol of lithium atoms of the alkyl lithium compound. The amount may be appropriately controlled within the range, thereby controlling the vinyl bond content arbitrarily. In the case where an ether compound is used, in particular, the amount thereof is preferably from 30 to 100 mol, and more preferably from 40 to 100 mol, based on 1 mol of lithium atoms of the alkyl lithium compound.

As the hydrogenation reaction, such a method may be preferably employed that the block copolymer before hydrogenation is dissolved in an organic solvent that is inert to the reaction and the hydrogenation catalyst, such as n-hexane or cyclohexane, and molecular hydrogen is reacted therewith in the presence of the hydrogenation catalyst. Examples of the hydrogenation catalyst used include Raney nickel; a heterogeneous catalyst containing a metal, such as Pt, Pd, Ru, Rh or Ni, carried on a carrier, such as carbon, alumina or diatom earth; a Ziegler catalyst, such as a combination of a transition metal compound with an alkyl aluminum compound or an alkyl lithium compound; and a metallocene catalyst. The reaction may be performed under conditions of a hydrogen pressure of preferably from 0.1 to 20 MPa, and more preferably from 0.1 to 10 MPa, and a temperature of preferably from 20 to 250° C., more preferably from 50 to 200° C., and more preferably from 100 to 200° C., for a period of preferably from 0.1 to 100 hours.

The hydrogenated block copolymer (a) in the form of powder having a bulk density of from 0.10 to 0.40 g/mL specified in the present invention may be produced, for example, in the following manner. The reaction solution, from which the hydrogenation catalyst has been removed by filtration after completing the hydrogenation reaction, is heated to preferably from 40 to 150° C., and more preferably from 60 to 150° C., and depending on necessity mixed with a surfactant, such as a fatty acid salt or a polyoxyalkylene derivative, and is then fed to a hot water at a temperature of from 80 to 130° C. at a rate of 100 parts by mass per hour, and simultaneously steam of 1 MPa is fed thereto at a rate of from 40 to 60 parts by mass per hour. Steam stripping is performed at a temperature of from the boiling point of the inert organic solvent, such as a saturated hydrocarbon, or in the case where the inert organic solvent and water undergo azeotropy, from the azeotropic temperature, to 150° C., and then the copolymer is dehydrated with a compression dehydrator to a water content of 55% by mass or less, and preferably 45% by mass or less (wet basis (WB), hereinafter the same), and then dried at a temperature of from 60 to 100° C. with a screw extrusion dryer, an expander drier, a heat conduction dryer, a hot air dryer or the like, thereby producing the target hydrogenated block copolymer (a) in the form of powder having a water content of 0.1% by mass or less.

Softening Agent (b)

The thermoplastic elastomer composition used in the present invention contains (b) a softening agent for providing flexibility, molding processability and the like. Examples of the softening agent (b) include a process oil of paraffin series, naphthene series or aromatic series; a phthalic acid derivative, such as dioctyl phthalate and dibutyl phthalate; a white oil; a mineral oil; a liquid oligomer of ethylene and an α-olefin; liquid paraffin; polybutene; low molecular weight polyisobutylene (having a peak top molecular weight of from 400 to 90,000); and a liquid polydiene, such as liquid polybutadiene, liquid polyisoprene, a liquid poly(isoprene-butadiene) copolymer, a liquid poly(styrene-butadiene) copolymer and a liquid poly(styrene-isoprene) copolymer, and a hydrogenated product thereof. These materials may be used solely or as a combination of two or more kinds thereof.

Among these, a paraffin series process oil, a liquid oligomer of ethylene and an α-olefin, and liquid paraffin are preferred from the standpoint of compatibility with the hydrogenated block copolymer (a).

The content of the softening agent (b) is from 5 to 150 parts by mass per 100 parts by mass of the hydrogenated block copolymer (a), and is preferably from 30 to 150 parts by mass, more preferably from 50 to 150 parts by mass, and further preferably from 60 to 130 parts by mass, and particularly preferably from 70 to 120 parts by mass, from the standpoint of the molding processability. When the content of the softening agent (b) is less than 5 parts by mass per 100 parts by mass of the hydrogenated block copolymer (a), the resulting thermoplastic elastomer composition may be deteriorated in flexibility and molding processability, and when it exceeds 150 parts by mass, the container stopper of the present invention may be deteriorated in oxygen gas barrier property.

Polyolefin Resin (c)

The thermoplastic elastomer composition used in the present invention contains (c) a polyolefin resin from the standpoint of enhancing the moldability, the mechanical strength of the resulting foam-molded article and the like. Examples of the polyolefin resin (c) include polyethylene, such as high density polyethylene, medium density polyethylene, low density polyethylene and linear low density polyethylene, a homopolymer of propylene, such as homopolypropylene, a block copolymer of propylene and ethylene (block polypropylene), a random copolymer of propylene and ethylene (random polypropylene), and a copolymer of propylene or ethylene and an α-olefin. Examples of the α-olefin include an α-olefin having 20 or less carbon atoms, such as 1-butene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene and 1-eicosene, which may be used solely or as a combination of two or more kinds thereof.

Among the polyolefin resins (c) above, homopolypropylene and high density polyethylene are preferred from the standpoint of maintaining the oxygen gas barrier property of the container stopper of the present invention within a favorable range.

The content of the polyolefin resin (c) is from 5 to 150 parts by mass per 100 parts by mass of the hydrogenated block copolymer (a), and is preferably from 10 to 120 parts by mass, more preferably from 20 to 100 parts by mass, and further preferably from 30 to 100 parts by mass. When the content of the polyolefin resin (c) is less than 5 parts by mass per 100 parts by mass of the hydrogenated block copolymer (a), the mechanical strength of the foam-molded article obtained from the thermoplastic elastomer composition may be lowered, and when it exceeds 150 parts by mass, the hardness of the foam-molded article obtained from the thermoplastic elastomer composition may be increased to deteriorate the flexibility, and the rubber elasticity, and thus the packing capability as a container stopper may be deteriorated.

Additive: Tackifier

The thermoplastic elastomer composition used in the present invention may be, depending on necessity, a thermoplastic elastomer composition that contains a tackifier in such a range that the advantages of the present invention are not considerably impaired. The tackifier used may be any material that has been used as a tackifier, without particular limitation. Examples thereof include a rosin resin, such as gum rosin, tall oil rosin, wood rosin, hydrogenated rosin, disproportionated rosin, polymerized rosin, and rosin ester, e.g. glycerin esters and pentaerythritol esters thereof; a terpene resin, such as a terpene resin mainly containing α-pinene, β-pinene, dipentene or the like, an aromatic-modified terpene resin, a hydrogenated terpene resin and a terpene phenol resin; a petroleum resin, which may be hydrogenated, such as a (hydrogenated) aliphatic (C5 series) petroleum resin, a (hydrogenated) aromatic (C9 series) petroleum resin, a (hydrogenated) copolymer (C5-C9 copolymer series) petroleum resin, a (hydrogenated) dicyclopentadiene petroleum resin and an alicyclic saturated hydrocarbon resin; a styrene resin, such as poly-α-methylstyrene, an α-methylstyrene-styrene copolymer, a styrene monomer-aliphatic monomer copolymer, a styrene monomer-α-methylstyrene-aliphatic monomer copolymer, and a styrene monomer-aromatic monomer (excluding a styrene monomer) copolymer; a phenol resin; a xylene resin; and synthetic resins, such as a coumarone-indene resin. Among these, a hydrogenated terpene resin, an alicyclic saturated hydrocarbon resin and a (hydrogenated) aliphatic (C5 series) petroleum resin are preferred from the standpoint of prevention of coloration of the foam-molded article obtained by foaming the thermoplastic elastomer composition. These materials may be used solely or as a combination of two or more kinds thereof.

In the case where the thermoplastic elastomer composition of the present invention contains the tackifier, the amount thereof is preferably from 10 to 150 parts by mass, more preferably from 30 to 130 parts by mass, further preferably from 50 to 120 parts by mass, and particularly preferably from 50 to 90 parts by mass, per 100 parts by mass of the hydrogenated block copolymer (a). When the content of the tackifier is 10 parts by mass or more per 100 parts by mass of the hydrogenated block copolymer (a), the foam-molded article may have good oxygen gas barrier property, and when the content is 150 parts by mass or less, the tackiness of the resulting thermoplastic elastomer composition does not become too high, thereby providing good processability and moldability.

The softening point of the tackifier is preferably from 50 to 150° C., and more preferably from 100 to 150° C., from the standpoint of the oxygen gas barrier property.

Other Additives

The thermoplastic elastomer composition used in the present invention may contain various additives depending on necessity in such a range that does not considerably impair the advantages of the present invention. Examples of the additives include a lubricant, an antioxidant, a heat stabilizer, a light resisting agent, a weather resisting agent, a metal inactivator, an ultraviolet ray absorbent, a light stabilizer, a copper inhibitor, a filler, a reinforcing agent, an antistatic agent, an antimicrobial agent, an antifungal agent, a dispersant, a colorant, a rubber, such as an isobutylene-isoprene copolymer and a silicone rubber, and a thermoplastic resin, such as an ethylene-vinyl acetate copolymer and an ABS resin.

Among these, a lubricant has a function of enhancing the fluidity of the thermoplastic elastomer composition, and preventing heat deterioration thereof. Examples of the lubricant that may be used in the present invention include a silicone oil, a hydrocarbon lubricant, such as paraffin wax, micro wax and polyethylene wax, butyl stearate, stearic acid monoglyceride, pentaerythritol tetrastearate and stearyl stearate.

Examples of the filler include carbon black, clay, glass fibers and carbon fibers.

Foaming Agent (d)

In the present invention, the mixture containing from 0.1 to 3% by mass of the foaming agent (d) based on the total mass of the total thermoplastic elastomer composition is foamed, thereby providing a container stopper containing a foam-molded article having an expansion ratio of from 1.1 to 2.5 times.

Examples of the foaming agent (d) include an inorganic foaming agent, such as ammonium carbonate, ammonium hydrogen carbonate, sodium hydrogen carbonate, ammonium nitrite, sodium borohydride and an azide compound; an organic foaming agent, such as an N-nitroso compound, e.g., N,N'-dinitrosopentamethylenetetramine and N,N'-dimethyl-N,N'-dinitrosoterephthalamide, an azo compound, e.g., azobisisobutyronitrile, azodicarbonamide and barium azodicarboxylate, a fluorinated alkane, e.g., trichloromonofluoromethane and dichloromonofluoromethane, a sulfonylhydrazine compound, e.g., p-toluenesulfonyl hydrazide, diphenylsulfone-3,3'-disulfonyl hydrazide, 4,4'-oxybis(benzenesulfonyl hydrazide) and allyl-bis(sulfonyl hydrazide), a sulfonylsemicarbazide compound, e.g., p-toluoylenesulfonylsemicarbazide and 4,4'-oxybis(benzenesulfonylsemicarbazide), and a triazole compound, e.g., 5-morpholyl-1,2,3,4-thiatriazole; and thermoexpandable fine particles containing a thermoexpandable compound, such as isobutane and pentane, encapsulated in microcapsules formed of a thermoplastic resin of vinylidene chloride, acrylonitrile, an acrylate ester, a methacrylate ester or the like. These materials may be used solely or as a combination of two or more kinds thereof.

Examples of the commercially available products of the thermoexpandable fine particles include "Microsphere" (a trade name, epoxy resin-encapsulated microcapsules), produced by Matsumoto Yushi-Seiyaku Co., Ltd., "Fillite" (a trade name, inorganic microbaloons), produced by Japan Fillite Co., Ltd., and "Expancel" (a trade name, organic microbaloons), produced by Akzo Nobel Co., Ltd. Among the foaming agents, an inorganic foaming agent, an azo compound and a sulfonylhydrazine compound are preferred from the standpoint of safety for human bodies.

The content ratio of the foaming agent (d) in the mixture is from 0.1 to 3% by mass based on the total mass of the thermoplastic elastomer composition as described above, and is preferably from 0.3 to 2.8% by mass, more preferably from 0.3 to 2.0% by mass, and particularly preferably from 0.5 to 2.0% by mass. The total mass of the thermoplastic elastomer composition does not include the mass of the foaming agent (d).

When the content ratio of the foaming agent in the mixture is less than 0.1% by mass, the resulting foam-molded article may have an insufficient expansion ratio, which may results in poor rubber elasticity in some cases, and when it exceeds 3% by mass, the foaming cells may excessively grow to fail to provide appropriate independent foamed cells, thereby deteriorating the flavor retention property and the oxygen gas barrier property.

As a foaming agent, a master batch containing the aforementioned foaming agent (d) with a thermoplastic resin, such as a polyolefin, is also commercially available and may be used herein. In this case, the content of the foaming agent (d) is calculated from a value obtained by multiplying the mass of the master batch by the content ratio of the foaming agent.

In the case where the foam-molded article is produced, a nucleating agent may be used depending on necessity. Examples of the nucleating agent include a metal oxide, a composite oxide, a metal carbonate, a metal sulfate and a metal hydroxide, such as talc, silica, alumina, mica, titania, zinc oxide, zeolite, calcium carbonate, magnesium carbonate, barium sulfate and aluminum hydroxide. In the case where the nucleating agent is used, the amount thereof is generally preferably from 0.1 to 3 parts by mass, and more preferably from 0.1 to 2 parts by mass, per 100 parts by mass of the thermoplastic elastomer composition, whereby the cell diameter of the foamed cells of the foamed molded article may be easily controlled, and the foamed molded article may have suitable flexibility.

The method of adding the nucleating agent is not particularly limited, and examples thereof include a method of dry-blending with the thermoplastic elastomer composition, and a method of melt-kneading with the components upon producing the thermoplastic elastomer composition.

Production Method of Thermoplastic Elastomer Composition

The production method of the thermoplastic elastomer composition used in the present invention is not particularly limited, and examples thereof include (i) a method of preliminarily mixing the hydrogenated block copolymer (a), the softening agent (b), the polyolefin resin (c), and depending on necessity, the additives, and then melt-kneading them with an extruder, such as a single screw extruder, a multi-screw extruder, a Banbury mixer, a Brabender mixer, open rolls and a kneader, or a kneading machine, and (ii) a method of feeding the hydrogenated block copolymer (a), the softening agent (b), the polyolefin resin (c), and depending on necessity, the additives, from the separate charging ports of the aforementioned extruder or kneader, and melt-kneading them therein.

Examples of the method of preliminarily mixing include methods of using mixers, such as a Henschel mixer, a high-speed mixer, a V-blender, a ribbon blender, a tumble mixer and a conical blender.

Foaming Method and Production Method of Container Stopper

Examples of the method of foaming the mixture of the thermoplastic elastomer composition and the foaming agent (d) include a chemical method of foaming by decomposition or chemical reaction of the foaming agent (d), and a method of combining the chemical method and a physical method, such as supercritical foaming and water foaming.

The production method of the container stopper is not particularly limited, and a method that is ordinarily used for foam-molding, such as injection foam-molding and extrusion foam-molding, may be employed.

The container stopper of the present invention may be obtained, for example, by injection foam-molding a mixture obtained by dry-mixing the foaming agent (d) with the thermoplastic elastomer composition, into a die having a cavity of a desired shape. In alternative, the container stopper containing a foam-molding article having a desired shape may also be obtained by extrusion foam-molding the mixture into an arbitrary shape, such as a columnar shape, and cutting the molded article into the desired shape. Furthermore, the foaming agent (d) may be melt-kneaded with the components upon producing the thermoplastic elastomer composition, and then the mixture may be foam-molded. In this case, the kneading temperature is preferably lower than the decomposition temperature of the foaming agent.

Among these foam-molding methods, the injection foam-molding and the extrusion foam-molding are preferred from the standpoint of the productivity, and the injection foam-molding is particularly preferred from the standpoint of maintaining the good oxygen gas barrier property of the container stopper containing the resulting foam-molded article.

Properties and Characteristics of Container Stopper

The container stopper thus obtained contains the foam-molded article having an expansion ratio of from 1.1 to 2.5 times, preferably from 1.3 to 2.2 times, and more preferably from 1.4 to 1.9 times.

When the expansion ratio is in the range, fine and uniform independent foamed cells are formed, and the resulting container stopper containing the foam-molded article is excellent in oxygen gas barrier property and shape retention property after pull-out. When the expansion ratio is less than 1.1 times, the resulting container stopper has poor flexibility, which may make insertion and pull-out of the stopper difficult, and when the expansion ratio exceeds 2.5 times, the foaming cells are united to form cells with large and non-uniform size, which may result in deteriorated oxygen gas barrier property of the resulting container stopper.

The container stopper of the present invention is obtained by using the thermoplastic elastomer composition, and thus is excellent particularly in oxygen gas barrier property. Specifically, the oxygen transmission rate (unit: mL·44.2 mm/m$^2$·day·atm) measured according to JIS K7126-1 (differential pressure method) of a film specimen, which is produced by the method described in the examples with the thermoplastic elastomer composition before foam-molding, is preferably from 3 to 25, more preferably from 3 to 22.6, further preferably from 4 to 20.4, and particularly preferably from 4 to 19. When the oxygen transmission rate of the thermoplastic elastomer composition measured under the conditions is in the range, the container stopper may be favorably used.

EXAMPLES

The present invention will be described in more detail with reference to examples below, but the present invention is not limited to the examples. The properties and characteristics in Reference Examples, Examples and Comparative Examples were evaluated in the following manners.

(1) Content of Polymer Block (A) in Hydrogenated Block Copolymer

The block copolymer (a) or (a') after hydrogenation was dissolved in CDCl$_3$ and measured for the $^1$H-NMR spectrum (apparatus: JNM-Lambda 500 (produced by JEOL, Ltd., measurement temperature: 50° C.), and the content of the polymer block (A) was calculated from the peak intensity derived from styrene.

(2) Peak Top Molecular Weight (Mp)

The polymer block (A) before hydrogenation and the hydrogenated block copolymer (a) or (a') after hydrogenation were each measured for the peak top molecular weight (Mp) in terms of polystyrene by gel permeation chromatography (GPC) measurement.

Apparatus: Gel Permeation Chromatograph "HLC-8020" (produced by Tosoh Corporation)
Columns: G4000HXL (produced by Tosoh Corporation)×2
Eluent: tetrahydrofuran, flow rate: 1 mL/min
Injection volume: 150 μL
Concentration: 5 mg/10 mL (block copolymer/tetrahydrofuran)
Column temperature: 40° C.
Calibration curve: prepared with standard polystyrene
Detecting method: differential refractometry (RI)

(3) Hydrogenation Degree of Hydrogenated Block Copolymer (a) or (a')

The block copolymer was measured for the iodine value before and after hydrogenation, and the hydrogenation degree (%) of the hydrogenated block copolymer (a) or (a') was calculated from the measured values.

hydrogenation degree (%)=(1−(iodine value of block copolymer after hydrogenation/iodine value of block copolymer before hydrogenation))×100

(4) Vinyl Bond Content of Polymer Block (B)

The block copolymer before hydrogenation was dissolved in CDCl$_3$ and measured for the $^1$H-NMR spectrum (apparatus: JNM-Lambda 500 (produced by JEOL, Ltd., measurement temperature: 50° C.), and the vinyl bond content (i.e., the total content of the 3,4-bond unit and the 1,2-bond unit) was calculated from the ratio of the total peak area of the structural unit derived from isoprene, butadiene or the mixture of isoprene and butadiene, and the peak area corresponding to the 3,4-bond unit and the 1,2-bond unit of the isoprene structural unit, the 1,2-bond unit of the butadiene structural unit, or these bond units in the case of the mixture of isoprene and butadiene.

(5) Bulk Density

The hydrogenated block copolymer (a) or (a') in the form of powder was weighed and placed in a measuring cylinder for measuring the volume, and the mass of the hydrogenated block copolymer (a) or (a') was divided by the volume to provide the bulk density.

(6) Oxygen transmission rate (Oxygen Gas Barrier Property)

The thermoplastic elastomer composition before foam-molding was measured for oxygen transmission rate was measured by a differential pressure type gas chromatography method according to JIS K7126-1 (differential pressure method).

Specifically, pellets of the thermoplastic elastomer composition obtained in Examples or Comparative Examples were compression-molded with a compression molding machine at 230° C. for 2 minutes, thereby producing a film test piece having a thickness of 300 μm, and the test piece was measured with a gas permeability measuring device ("GTR-10", Yanagimoto Mfg. Co., Ltd.) at an oxygen pressure of 0.25 MPa, a measurement temperature of 35° C. and a measurement humidity of 0% RH.

The unit of the oxygen transmission rate herein is a value converted to mL·44.2 mm/m² day·atm in consideration of the size of the ordinary wine bottles, i.e., 21.6 mm in diameter and 44.2 mm in height.

(7) Expansion Ratio

A columnar test piece having a diameter of 21.6 mm and a height of 44.2 mm was produced by injection-molding pellets of the thermoplastic elastomer composition obtained in Examples or Comparative Examples or a mixture obtained by dry-mixing the pellets and the foaming agent, with an injection molding machine ("IS-55EPN, produced by Toshiba Machine Co., Ltd.) at 195° C., and the expansion ratio (times) of the foam-molded article was measured from the weight of the test piece and the density of the thermoplastic elastomer composition before foaming according to the following expression.

The density of the thermoplastic elastomer composition before foaming was measured according to JIS K6350 with an electronic specific gravity measuring device, MD-200S (produced by Mirage Trading Co., Ltd.).

expansion ratio (times)=volume of columnar test piece (16.19 cm³)×density of thermoplastic elastomer composition before foaming (g/cm³)/ weight of test piece (g)

(8) Uniformity of Foam Cell Size

The columnar test piece obtained in the method described in the item (7) was evaluated for uniformity of foam cell size of the foam-molded article. The columnar test piece was cut into halves in the height direction with a utility knife, and the uniformity of the foam cell size was visually observed and evaluated according to the following standard.

A: uniform cell size with fine independent foamed cells dispersed

C: foam-molded article with shape largely different from shape of die obtained due to insufficient or excessive foaming (9) Pull-Off Property The columnar test piece obtained in the method described in the item (7) was coated with a 0.1 g of silicone oil (KF-36-300CS, produced by Shin-Etsu Chemical Co., Ltd.) and inserted to a wine bottle having a bore size of 19.5 mm with a manual wine bottle corking machine until the entire columnar test piece was inserted into the bottle, and the upper surface of the test piece and the mouth of the bottle formed a planar surface. After 48 hours, a corkscrew opener for wine bottles was screwed in the columnar test piece, and then the force required for pulling off the test piece (pull-off force) was measured by pulling the corkscrew opener with a tensile tester ("Instron 5566", produced by Instron Japan Co., Ltd.) with the lower part of the wine bottle being fixed, and evaluated according to the following standard. When the pull-off force is less than 20 kgf, the content liquid may leak, and when it exceeds 30 kgf, the columnar test piece may be difficult to pull off and may be broken, both cases of which are not favorable.

A: The pull-off force was from 20 to 30 kgf.
B: The pull-off force was from 20 to 30 kgf, but the columnar test piece was partially broken.
C: The pull-off force was less than 20 kgf or exceeded 30 kgf.

Reference Example 1

Production of Hydrogenated Block Copolymer (a)-1

1.84 kg of styrene and 55.8 kg of cyclohexane as a solvent were charged in a pressure resistant vessel substituted with dried nitrogen. To the solution, 45 mL of sec-butyl lithium (10% by mass cyclohexane solution) as an initiator was added, which was polymerized at 60° C. for 1 hour. After adding 305 g of tetrahydrofuran as a Lewis base to the reaction mixture, 8.57 kg of isoprene was added thereto, followed by polymerizing for 2 hours, and then 1.84 kg of styrene was further added thereto, followed by polymerizing for 1 hour, thereby providing a reaction solution containing a polystyrene-polyisoprene-polystyrene triblock copolymer. After collecting a small portion of the reaction solution for analysis, palladium carbon (palladium carried amount: 5% by mass) as a hydrogenation catalyst was added thereto in an amount of 5% by mass based on the copolymer, and hydrogenation reaction was performed under conditions of a hydrogen pressure of 2 MPa and a temperature of 150° C. for 5 hours. After cooling and releasing the pressure, the palladium carbon was removed by filtration, and then the filtrate was heated again to 80° C. and fed to hot water at 110° C. at a rate of 100 kg/hr. Simultaneously, steam at 1 MPa was fed thereto at a rate of 50 kg/hr, thereby performing steam stripping at a temperature inside the reaction vessel of 110±2° C. The resulting slurry was dehydrated with a compression dehydrator to a water content of 45%, and then dried at 120° C. with a plate dryer, thereby providing a hydrogenated product of a polystyrene-polyisoprene-polystyrene triblock copolymer having a water content of 0.1% by mass in the form of powder (which is hereinafter referred to as a hydrogenated block copolymer (a)-1). The resulting hydrogenated block copolymer (a)-1 had a hydrogenation degree of 97.2%, a content of the polymer block (A) of 29.4% by mass, a peak top molecular weight of the polymer block (A) of 37,500, a peak top molecular weight (Mp) of the hydrogenated block copolymer (a)-1 of 315,000, a vinyl bond content of the polymer block (B) of 55.2%, and a bulk density of 0.22 g/mL.

The data of properties of the hydrogenated block copolymer (a)-1 are shown in Table 1.

Reference Example 2

Production of Hydrogenated Block Copolymer (a)-2

The polymerization reaction, hydrogenation reaction, catalyst removal and drying were performed in the same manners as in Reference Example 1 except for the use of 55.8 kg of cyclohexane as a solvent, 58 mL of sec-butyl lithium (10% by mass cyclohexane solution) as an initiator, 330 g of tetrahydrofuran as a Lewis base, and as monomers to be polymerized, 1.96 kg of styrene, 8.32 kg of a mixture of isoprene and butadiene (isoprene/butadiene=55/45 (molar ratio)) and 1.96 kg of styrene, which were sequentially added for polymerization, thereby providing a hydrogenated product of a polystyrene-poly(isoprene/butadiene)-polystyrene triblock copolymer (which is hereinafter referred to as a hydrogenated block copolymer (a)-2). The resulting hydrogenated block copolymer (a)-2 had a hydrogenation degree of 98.3%, a content of the polymer block (A) of 31.3% by mass, a peak top molecular weight of the polymer block (A) of 31,000, a peak top molecular weight (Mp) of the hydrogenated block copolymer (a)-2 of 310,000, a vinyl bond content of the polymer block (B) of 60.1%, and a bulk density of 0.23 g/mL.

The data of properties of the hydrogenated block copolymer (a)-2 are shown in Table 1.

Reference Example 3

Production of Hydrogenated Block Copolymer (a')-3

The polymerization reaction, hydrogenation reaction, catalyst removal and drying were performed in the same manners as in Reference Example 1 except for the use of 55.8 kg of cyclohexane as a solvent, 58 mL of sec-butyl lithium (10% by mass cyclohexane solution) as an initiator, 132 g of tetrahydrofuran as a Lewis base, and as monomers to be polymerized, 2.02 kg of styrene, 8.20 kg of butadiene and 2.02 kg of styrene, which were sequentially added for polymerization, thereby providing a hydrogenated product of a polystyrene-polybutadiene-polystyrene triblock copolymer (which is hereinafter referred to as a hydrogenated block copolymer (a')-3). The resulting hydrogenated block copolymer (a')-3 had a hydrogenation degree of 99.4%, a content of the polymer block (A) of 32.2% by mass, a peak top molecular weight of the polymer block (A) of 31,000, a peak top molecular weight (Mp) of the hydrogenated block copolymer (a')-3 of 312,000, a vinyl bond content of the polymer block (B) of 40.2%, and a bulk density of 0.22 g/mL.

The data of properties of the hydrogenated block copolymer (a')-3 are shown in Table 1.

Reference Example 4

Production of Hydrogenated Block Copolymer (a')-4

The polymerization reaction, hydrogenation reaction, catalyst removal and drying were performed in the same manners as in Reference Example 1 except for the use of 55.8 kg of cyclohexane as a solvent, 52 mL of sec-butyl lithium (10% by mass cyclohexane solution) as an initiator, no tetrahydrofuran added, and as monomers to be polymerized, 1.84 kg of styrene, 8.57 kg of isoprene and 1.84 kg of styrene, which were sequentially added for polymerization, thereby providing a hydrogenated product of a polystyrene-polyisoprene-polystyrene triblock copolymer (which is hereinafter referred to as a hydrogenated block copolymer (a')-4). The resulting hydrogenated block copolymer (a')-4 had a hydrogenation degree of 98.5%, a content of the polymer block (A) of 29.4% by mass, a peak top molecular weight of the polymer block (A) of 29,600, a peak top molecular weight (Mp) of the hydrogenated block copolymer (a')-4 of 316,000, a vinyl bond content of the polymer block (B) of 7.3%, and a bulk density of 0.23 g/mL.

The data of properties of the hydrogenated block copolymer (a')-4 are shown in Table 1.

Reference Example 5

Production of Hydrogenated Block Copolymer (a')-5

The polymerization reaction, hydrogenation reaction, catalyst removal and drying were performed in the same manners as in Reference Example 1 except for the use of 55.8 kg of cyclohexane as a solvent, 110 mL of sec-butyl lithium (10% by mass cyclohexane solution) as an initiator, 312 g of tetrahydrofuran as a Lewis base, and as monomers to be polymerized, 2.02 kg of styrene, 9.90 kg of isoprene and 2.02 kg of styrene, which were sequentially added for polymerization, thereby providing a hydrogenated product of a polystyrene-polyisoprene-polystyrene triblock copolymer (which is hereinafter referred to as a hydrogenated block copolymer (a')-5). The resulting hydrogenated block copolymer (a')-5 had a hydrogenation degree of 97.0%, a content of the polymer block (A) of 28.5% by mass, a peak top molecular weight of the polymer block (A) of 16,000, a peak top molecular weight (Mp) of the hydrogenated block copolymer (a')-5 of 135,000, a vinyl bond content of the polymer block (B) of 58.2%, and a bulk density of 0.48 g/mL.

The data of properties of the hydrogenated block copolymer (a')-5 are shown in Table 1.

TABLE 1

|  | Reference Example 1 | Reference Example 2 | Reference Example 3 | Reference Example 4 | Reference Example 5 |
|---|---|---|---|---|---|
|  | Hydrogenated block copolymer | | | | |
|  | (a)-1 | (a)-2 | (a')-3 | (a')-4 | (a')-5 |
| Content of polymer block (A) (% by mass) | 29.4 | 31.3 | 32.2 | 29.4 | 28.5 |
| Peak top molecular weight of polymer block (A) | 37,500 | 31,000 | 31,000 | 29,600 | 16,000 |
| Compound deriving structural unit of polymer block (B) | isoprene | isoprene and butadiene | butadiene | isoprene | isoprene |
| Vinyl bond content of polymer block (B) (%) | 55.2 | 60.1 | 40.2 | 7.3 | 58.2 |
| Peak top molecular weight of hydrogenated block copolymer | 315,000 | 310,000 | 312,000 | 316,000 | 135,000 |
| Hydrogenation degree of hydrogenated block copolymer (%) | 97.2 | 98.3 | 99.4 | 98.5 | 97.0 |
| Bulk density of hydrogenated block copolymer (g/mL) | 0.22 | 0.23 | 0.22 | 0.23 | 0.48 |

Examples 1 to 8 and Comparative Examples 1 to 12

The components other than the foaming agent (d) in the formulations shown in Tables 2 and 3 (unit: part by mass) having been preliminarily mixed were fed to a twin screw extruder ("TEM-35B", produced by Toshiba Machine Co., Ltd.) and melt-kneaded and extruded under conditions of a cylinder temperature of 200° C. and a screw revolution number of 200 rpm into strands, which were cut with a pelletizer connected to the twin screw extruder, thereby producing pellets of the thermoplastic elastomer compositions. A film test piece was produced with the resulting pellets of the thermoplastic elastomer composition and measured for the oxygen transmission rate (unit: mL·44.2 mm/m$^2$·day·atm) according to the aforementioned manner. The results are shown in Tables 2 and 3.

Subsequently, the pellets of the thermoplastic elastomer composition or a mixture obtained by dry-mixing the foaming agent (d) with the pellets was measured for the expansion ratio, evaluated for the foam cell size, and measured for the pull-off force, according to the aforementioned manner. The results are shown in Tables 2 and 3.

The components shown in Table 2 and 3 are as follows.
Softening Agent (b): Diana Process Oil PW-90 (paraffin process oil, produced by Idemitsu Kosan Co., Ltd.)
Polyolefin Resin (c)-1: homopolypropylene, J107G, produced by Prime Polymer Co., Ltd. (MFR: 30 g per 10 minutes (230° C., 21.2 N load)
Polyolefin Resin (c)-2: high density polyethylene, HJ490, produced by Japan Polyolefins Co., Ltd. (MFR: 20 g per 10 minutes (190° C., 21.2 N load)
Foaming Agent (d)-1: sodium hydrogen carbonate, Cellborn SC-P, produced by Eiwa Chemical Ind. Co., Ltd.
Foaming Agent (d)-2: Hydrocerol BIH10E (produced by Clariant Japan Co., Ltd., master batch of foaming agent and low density polyethylene (content of foaming agent: 10% by mass))
Foaming Agent (d)-3: organic microbaloons, Expancel 930 MB120 (produced by Akzo Nobel Co., Ltd., master batch of dried and unexpanded product and ethylene-vinyl acetate copolymer (content of foaming agent: 15% by mass))
Tackifier: terpene hydrogenated resin, Clearon P-115, produced by Yasuhara Chemical Co., Ltd.

In the case where the master batch was used as the foaming agent in Tables 2 and 3, the amount of the foaming agent (d) mixed (% by mass) based on the mass of the total thermoplastic elastomer composition was calculated by multiplying the mass of the master batch by the content of the foaming agent.

TABLE 2

| | | Example | | | | | | | |
|---|---|---|---|---|---|---|---|---|---|
| | | 1 | 2 | 3 | 4 | 5 | 6 | 7 | 8 |
| Thermoplastic Elastomer Composition (part by mass) | | | | | | | | | |
| Hydrogenated block copolymer (a)-1 | | 100 | 100 | 100 | 100 | 100 | 100 | | |
| Hydrogenated block copolymer (a)-2 | | | | | | | | 100 | 100 |
| Softening agent (b) | | 100 | 100 | 115 | 115 | 80 | 80 | 100 | 115 |
| Polyolefin resin (c)-1 | | 40 | 60 | 100 | | 100 | | 60 | 100 |
| Polyolefin resin (c)-2 | | | | | 100 | | 100 | | |
| Tackifier | | | | | | 70 | 70 | | |
| Foaming agent (% by mass) | | | | | | | | | |
| Foaming agent (d)-1 | | 1.5 | 1.5 | | | | | 1.5 | |
| Foaming agent (d)-2 | | | | 0.45 | 0.4 | 0.45 | 0.45 | | 0.45 |
| Foaming agent (d)-3 | | | 0.3 | 0.3 | 0.3 | 0.3 | 0.3 | 0.3 | 0.3 |
| Properties and Characteristics | Expansion ratio (times) | 1.85 | 1.85 | 1.83 | 1.64 | 1.74 | 1.75 | 1.85 | 1.80 |
| | Uniformity of foam cell size | A | A | A | A | A | A | A | A |
| | Oxygen transmission rate | 23.6 | 20.8 | 18.2 | 13.4 | 8.2 | 6.2 | 21.0 | 20.3 |
| | Pull-off property | A | A | A | A | A | A | A | A |

TABLE 3

| | | Comparative Example | | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| Thermoplastic Elastomer Composition (part by mass) | | | | | | | | | | | | | |
| Hydrogenated block copolymer (a)-1 | | 100 | 100 | 100 | 100 | 100 | | | | | | | |
| Hydrogenated block copolymer (a)-2 | | | | | | | | | | | | | 100 |
| Hydrogenated block copolymer (a')-3 | | | | | | | 100 | 100 | 100 | | | | |
| Hydrogenated block copolymer (a')-4 | | | | | | | | | | 100 | 100 | | |
| Hydrogenated block copolymer (a')-5 | | | | | | | | | | | | 100 | |
| Softening agent (b) | | 100 | 100 | 100 | 200 | 100 | 100 | 100 | 115 | 100 | 115 | 100 | 200 |
| Polyolefin resin (c)-1 | | 60 | 60 | 60 | 40 | 200 | 40 | 60 | 100 | 60 | 100 | 60 | 40 |
| Polyolefin resin (c)-2 | | | | | | | | | | | | | |
| Tackifier | | | | | | | | | | | | | |
| Foaming agent (% by mass) | | | | | | | | | | | | | |
| Foaming agent (d)-1 | | | 5.0 | | 1.5 | | 1.5 | 1.5 | | | | | 1.5 |
| Foaming agent (d)-2 | | | | 1.0 | | 0.45 | | | 0.45 | 0.45 | 0.45 | 0.45 | |
| Foaming agent (d)-3 | | | | 3.0 | 0.3 | 0.3 | | 0.3 | 0.3 | 0.3 | 0.3 | 0.3 | 0.3 |
| Properties and Characteristics | Expansion ratio (times) | 1.00 | 3.72 | (*1) | 1.92 | 1.85 | 1.85 | 1.85 | 1.80 | 1.80 | 1.80 | (*1) | 1.94 |
| | Uniformity of foam cell size | C | C | C | A | C | C | C | C | C | C | C | A |
| | Oxygen transmission rate | 20.8 | 20.8 | 20.8 | 36.2 | 11.1 | 30.8 | 26.1 | 21.4 | 23.0 | 20.9 | 20.9 | 36.6 |

TABLE 3-continued

| | Comparative Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Pull-off property | C | C | not measured | A | C | A | B | B | A | C | not measured | A |

(*1): molding failure, unmoldable due to excessive foaming

It is understood from Table 2 that the foam-molded articles obtained in Examples 1 to 8 have uniform foam cell size, are all excellent in oxygen gas barrier property, and thus are useful as a container stopper. Furthermore, they are excellent in pull-off property and thus are suitable as a stopper for wine bottles.

It is understood from Table 3 that the molded article obtained in Comparative Example 1 is not foamed due to the absence of a foaming agent, and thus has deteriorated pull-off property.

In Comparative Example 2, the amount of the foaming agent (d) mixed is too large, and thus the resulting foam-molded article has an expansion ratio larger than the range specified in the present invention and non-uniform foam cell size. The pull-off property thereof was deteriorated.

In Comparative Example 3, two kinds of the foaming agents (d) are used in combination, but the amount thereof is too large, and thus a favorable foam-molded article is not obtained due to excessive foaming.

In Comparative Examples 4 and 12, the content of the softening agent (b) is larger than the range specified in the present invention, and thus the resulting foam-molded articles have a large oxygen transmission rate and deteriorated oxygen gas barrier property.

In Comparative Example 5, the content of the polyolefin resin (c) is larger than the range specified in the present invention, and thus the resulting foam-molded article has non-uniform foam cell size. The pull-off property thereof was deteriorated.

In Comparative Examples 6 to 8, the polymer block (B) constituting the hydrogenated block copolymer (a')-3 as a component of the thermoplastic elastomer composition is constituted by butadiene, and thus the resulting foam-molded articles have a large oxygen transmission rate and deteriorated oxygen gas barrier property in Comparative Examples 6 and 7, and have non-uniform foam cell size in all the foam-molded articles of Comparative Examples 6 to 8. The foam-molded articles obtained in Comparative Examples 7 and 8 are deteriorated in pull-off property.

In Comparative Examples 9 and 10, the vinyl bond content of the polymer block (B) constituting the hydrogenated block copolymer (a')-4 as a component of the thermoplastic elastomer composition is 7.3%, which is smaller than the value specified in the present invention, and thus the resulting foam-molded articles have non-uniform foam cell size. The foam-molded article obtained in Comparative Example 10 is deteriorated in pull-off property.

In Comparative Example 11, the peak top molecular weight (Mp) of the hydrogenated block copolymer (a')-5 as a component of the thermoplastic elastomer composition is 135,000, which is smaller than the value specified in the present invention, and the bulk density thereof is 0.48 g/mL, which is outside the range specified in the present invention. Thus, excessive foaming occurs on molding, and a foam-molded article capable of being measured for properties cannot be molded.

INDUSTRIAL APPLICABILITY

The container stopper of the present invention containing a foam-molded article excellent in uniformity of foam cell size is excellent in oxygen gas barrier property and pull-off property, and thus is favorably applied to a stopper for food containers and beverage containers, and particularly to a stopper for glass bottles, such as wine bottles.

The invention claimed is:

1. A container stopper comprising a foam-molded article having an expansion ratio of from 1.1 to 2.5 times,
   wherein the foam-molded article is obtained by foaming a mixture comprising:
   a thermoplastic elastomer composition consisting essentially of components (a) to (d)
   (a) 100 parts by mass of at least one hydrogenated block copolymer that is a hydrogenated product of a block copolymer comprising (A) a polymer block comprising, in reacted form, an aromatic vinyl compound, and (B) a polymer block comprising, in reacted form, isoprene or a mixture of isoprene and butadiene, having a total content of a 3,4-bond unit and a 1,2-bond unit of 45% or more, wherein the hydrogenated block copolymer has a peak top molecular weight (Mp) obtained by gel permeation chromatography in terms of a polystyrene standard of from 250,000 to 500,000, and is in a form of powder having a bulk density of from 0.10 to 0.40 g/mL,
   wherein the hydrogenated block (A) in the hydrogenated block copolymer (a) is from 15 to 35% by mass, based on a mass of the hydrogenated block copolymer (a),
   wherein a hydrogenation degree of the polymer block (B) is 80% by mole or more,
   wherein a content of isoprene or a mixture of isoprene and butadiene in the polymer block (B), in reacted form, is 95% by mass or more, based on a mass of the polymer block (B),
   wherein a bonding mode of the polymer block (A) and the polymer block (B) of the hydrogenated block copolymer (a) is a di-block structure represented by A-B or a tri-block structure represented by A-B-A, wherein A is the polymer block (A) and B is the polymer block (B),
   (b) from 60 to 150 parts by mass of at least one softening agent selected from the group consisting of a paraffin series process oil, a liquid oligomer of ethylene and an α-olefin, and liquid paraffin,
   (c) from 5 to 150 parts by mass of at least one polyolefin resin selected from the group consisting of polyethylene, a homopolymer of propylene, a block copolymer of propylene and ethylene, and a random copolymer of propylene and ethylene; and
   (d) from 0.1 to 3% by mass, based on a total mass of the thermoplastic elastomer composition, of at least one foaming agent selected from the group consisting of an inorganic foaming agent and thermoexpandable fine particles.

2. The container stopper of claim 1, wherein the polymer block (B) of the hydrogenated block copolymer (a) comprises, in reacted form, isoprene.

3. The container stopper of claim 1, wherein the content of the softening agent (b) in the thermoplastic elastomer composition is from 70 to 120 parts by mass, and the content of the polyolefin resin (c) is from 30 to 100 parts by mass, per 100 parts by mass of the hydrogenated block copolymer (a).

4. The container stopper of claim 2, wherein the content of the softening agent (b) in the thermoplastic elastomer composition is from 70 to 120 parts by mass, and the content of the polyolefin resin (c) is from 30 to 100 parts by mass, per 100 parts by mass of the hydrogenated block copolymer (a).

5. The container stopper of claim 1, wherein the polymer block (B) of the hydrogenated block copolymer (a) comprises, in reacted form, a mixture of isoprene and butadiene.

6. The container stopper of claim 1, wherein a content of at least one aromatic vinyl compound selected from the group consisting of styrene, α-methylstyrene, β-methylstyrene, o-methylstyrene, m-methylstyrene, p-methylstyrene, 4-t-butylstyrene, 2,4-dimethylstyrene, 2,4,6-trimethylstyrene, monofluorostyrene, difluorostyrene, monochlorostyrene, dichlorostyrene, methoxystyrene, vinylnaphthalene and vinylanthracene, in the polymer block (A), in reacted form, is 90% by mass or more, based on a mass of the polymer block (A).

7. The container stopper of claim 1, wherein a content of at least one aromatic vinyl compound selected from the group consisting of styrene, α-methylstyrene, β-methylstyrene, o-methylstyrene, m-methylstyrene, p-methylstyrene, 4-t-butylstyrene, 2,4-dimethylstyrene, 2,4,6-trimethylstyrene, monofluorostyrene, difluorostyrene, monochlorostyrene, dichlorostyrene, methoxystyrene, vinylnaphthalene and vinylanthracene, in the polymer block (A), in reacted form, is 95% by mass or more, based on a mass of the polymer block (A).

8. The container stopper of claim 1, wherein a content of at least one aromatic vinyl compound selected from the group consisting of styrene, α-methylstyrene, β-methylstyrene, o-methylstyrene, m-methylstyrene, p-methylstyrene, 4-t-butylstyrene, 2,4-dimethylstyrene, 2,4,6-trimethylstyrene, monofluorostyrene, difluorostyrene, monochlorostyrene, dichlorostyrene, methoxystyrene, vinylnaphthalene and vinylanthracene, in the polymer block (A), in reacted form, is 100% by mass, based on a mass of the polymer block (A).

9. The container stopper of claim 1, wherein a content of styrene in the polymer block (A), in reacted form, is 90% by mass or more, based on a mass of the polymer block (A).

10. The container stopper of claim 1, wherein a content of styrene in the polymer block (A), in reacted form, is 95% by mass or more, based on a mass of the polymer block (A).

11. The container stopper of claim 1, wherein a content of isoprene or a mixture of isoprene and butadiene in the polymer block (B), in reacted form, is 100% by mass, based on a mass of the polymer block (B).

12. The container stopper of claim 1, wherein the total content of a 3,4-bond unit and a 1,2-bond unit is from 53 to 70%.

13. The container stopper of claim 1, wherein a hydrogenation degree of the polymer block (B) is 90% by mole or more.

14. The container stopper of claim 1, wherein the hydrogenated block copolymer has a peak top molecular weight (Mp) of 310,000 to 350,000.

15. The container stopper of claim 1, wherein the thermoplastic elastomer does not comprise polybutene-1.

* * * * *